United States Patent [19]
Sekhon

[11] 3,858,479
[45] Jan. 7, 1975

[54] BLIND FASTENER SET BY ROTARY STUD HAVING THREADS OF OPPOSITE HAND

[75] Inventor: Jagdish S. Sekhon, Fountain Valley, Calif.

[73] Assignee: Hi-Shear Corporation, Torrance, Calif.

[22] Filed: Sept. 14, 1973

[21] Appl. No.: 397,323

[52] U.S. Cl. .................................. 85/70, 10/27 R
[51] Int. Cl. ............................................ F16b 13/06
[58] Field of Search .............. 85/70, 71, 67, 69, 74, 85/75, 76; 151/16; 403/43, 44, 45, 46, 47, 48; 10/27 R

[56] References Cited
UNITED STATES PATENTS

| | | | |
|---|---|---|---|
| 2,562,336 | 7/1951 | Selden | 85/70 |
| 2,625,071 | 1/1953 | Lewis | 85/67 |
| 3,227,031 | 1/1966 | Williams | 85/67 |
| 3,303,736 | 2/1967 | Raynovich | 85/67 |
| 3,453,927 | 7/1969 | Moore | 85/70 |
| 3,463,046 | 8/1969 | Welch et al. | 85/70 |
| 3,653,294 | 4/1972 | Nason | 85/70 |
| 3,667,340 | 6/1972 | Black | 85/71 |

FOREIGN PATENTS OR APPLICATIONS

| | | | |
|---|---|---|---|
| 512,884 | 2/1955 | Italy | 85/71 |

*Primary Examiner*—Marion Parsons, Jr.
*Attorney, Agent, or Firm*—Donald D. Mon; D. Gordon Angus

[57] ABSTRACT

A blind fastener for fastening bodies together comprises a hollow tubular sleeve provided with a head, and a stud passing through the hole through the sleeve. The stud is provided with threads near its front end which engage corresponding threads near the front end of the sleeve. The stud also has threads near its rear end of opposite hand to its threads at the front end, and these rear end threads engage threads formed near the rear end of the sleeve so that the stud cannot be turned within the sleeve by ordinary torquing forces. The formation of the rear threads in the sleeve is done by compressing or swaging the rear part of the shank of the sleeve, causing material of the shank to flow into the rear threads of the stud, thereby forming the corresponding rear threads in the shank.

To use the fastener to fasten bodies together, the sleeve is protruded through aligned holes in the bodies so that the head of the sleeve abuts the forward face of the bodies, and the forward part of the stud protrudes forwardly from the head. The rear parts of the stud and sleeve protrude outwardly from the bodies being fastened. To set the fastener an extraordinarily great torquing force must be used on the stud, which must result in deformation of the sleeve owing to the presence of the opposite hand threads. This relatively great torquing force is applied at the front end of the stud in the direction which moves the stud forwardly and draws the rear part of the sleeve toward the front part of the sleeve, causing the part of the shank to the rear of the bodies to buckle outwardly and abut the rear body, thereby setting the fastener.

5 Claims, 5 Drawing Figures

Patented Jan. 7, 1975

3,858,479

BLIND FASTENER SET BY ROTARY STUD HAVING THREADS OF OPPOSITE HAND

This invention relates to blind fasteners.

A blind bolt or stud assembly commonly comprises a bolt or stud, or the like, having a head and threaded shank which is passed through a hollow sleeve also provided with a head and shank. The threaded rear end of the bolt or stud ordinarily extends beyond the shank of the sleeve and a threaded collar has usually been attached to the threaded rear end of the bolt. Such an assembly is ordinarily passed through aligned holes of sheets or bodies which are to be fastened together, so that the collar on the bolt threads is to the rear of these bodies. when the bolt is turned from the front or head side of the bodies, which is ordinarily the only side at which a blind fastener may be operated, the collar is pulled toward the head of the bolt and it usually produces a deformation of a part of the assembly behind the bodies to be fastened, thereby setting the blind fastener and securing the bodies tightly together.

The setting of blind fasteners, including blind bolts and studs, involves problems not present in the case of ordinary fasteners. Since no setting mechanism can be placed behind the fastener as in the case of an ordinary fastening operation, the tightness and durability of the fastener is dependent on such operations as can be performed from the front or head side. Problems inherent in the use of blind fasteners have often produced set fasteners which are weaker than desired or which have been improperly set, or set too loose, or even if set tightly, may loosen up in service particularly when subjected to vibration.

An object of this invention is to provide a blind fastener assembly of the blind stud type, which is simple, strong and lightweight, easy to manufacture and install and is substantially vibration-proof.

In accordance with this invention, a stud provided with threads of one hand over a portion of it, and threads of the other hand over another portion of it, is threaded through a hollow sleeve provided with a head at its front end and provided internally over a portion near the head with threads of the one hand adapted to thread to the threads of the same hand of the stud. The stud is threaded through the hole of the sleeve far enough so that its threads of the other hand will be positioned to the rear of bodies to be fastened, while the front end of the stud protrudes forwardly from the head of the sleeve. The sleeve containing the stud positioned in this manner is passed through aligned holes through the sheets or bodies to be fastened together, so that the head abuts the forward one of the bodies, while the shank of the sleeve protrudes rearward of the rearmost one of the bodies. A feature of the assembly resides in the formation of internal threads near the rear part of the hollow sleeve, these being threads of the said other hand to match and thread to the threads of said other hand at the rear part of the stud.

A preferred manner of making this assembly of the stud and sleeve threaded to each other with threads of opposite hand is to first thread the forward threads of the stud through the forward threads of the sleeve to the desired relative position of stud and sleeve. Following this, a rear portion of the sleeve is circumferentially compressed to swage material of the sleeve, causing it to flow into the rear threads of the stud thereby creating the rear threads of the sleeve to match the rear threads of the stud. When this operation is accomplished, and stud can no longer be turned readily within the sleeve because the threads of opposite hand would then be attempting to move the two separate parts of the stud in opposite directions.

The material of the sleeve is ductile enough, however, so that by the application of a suitable torquing tool applied to the head of the sleeve and to the forwardly protruding part of the stud enough torque can be developed to turn the stud relative to the sleeve. Because the forward threads and rear threads are of opposite hand relative to each other, this will draw the rear portion of the sleeve toward the head, causing the shank to buckle up against the rear body being fastened, thereby setting the fastener. When it has attained this set condition, the fastener will remain firmly in place and cannot be loosened or turned by any ordinary means, such as vibration or usage, for it would take as much torque to unset the fastener by deforming the bulge back to its original condition as it took to create the deformation in the first place.

The foregoing and other features of the invention will be better understood from the following detailed description and the accompanying drawing of which:

Figure 1:
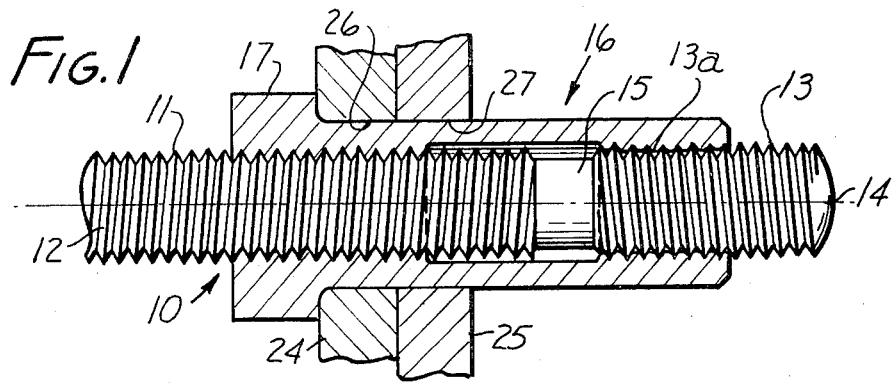
FIG. 1 shows partially in cross-section a blind fastener assembly according to this invention positioned to be set to fasten together a pair of members.
Figure 2:
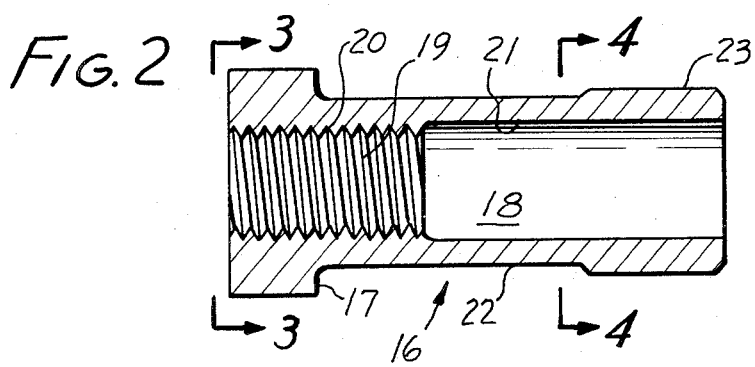
FIG. 2 shows in cross-section a sleeve used in the assembly of FIG. 1.
Figure 3:
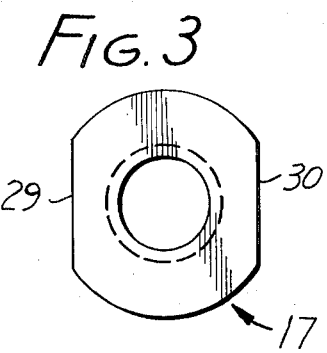
FIG. 3 is an end view of the sleeve looking from line 3—3 of FIG. 2.
Figure 4:
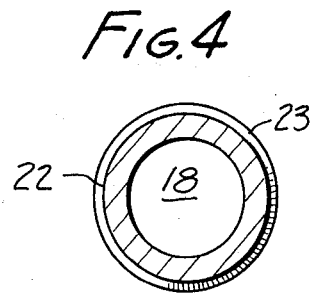
FIG. 4 is a cross-section view taken at line 4—4 of FIG. 3.

FIG. 1 shows a stud 10 having a lefthand thread 11 extending over a forward section or length 12 of the stud, and a righthand thread 13 over another section or length 14 at the rear end of the stud, the sections 12 and 14 being separated by an unthreaded section 15. The forward section 12 is threaded through a sleeve 16, which is shown in FIG. 2 before being applied to the stud. The sleeve 16 shown in FIG. 2 has a head 17 at its forward end with a rearwardly extending shank, and a hole 18 passing through it along its longitudinal axis. The forward part 19 of the hole is provided with a lefthand thread 20 of the same pitch and diameter as that of thread 11 of the stud, which enables thread 20 to be threaded to thread 11. The section 21 of the hole to the rear of the threading 20 is of a diameter at least as large as the maximum thread diameter of threads 11 and 13 of the stud so that threads 11 and 13 may readily pass through section 21 when assembling the stud to the sleeve as shown in FIG. 1. The section 21 of the sleeve to the rear of the threads 20 is cylindrical as shown in FIG. 2, and the exterior surface 22 of the sleeve behind the head 17 is also cylindrical except that the rearmost section 23 of the sleeve is thicker than the remainder of the shank of the sleeve so that the outside diameter of this thickened portion is somewhat greater than that of the rest of the shank of the sleeve.

To assemble the sleeve of FIG. 2 with the stud of FIG. 1 the threads 20 of the sleeve are threaded to the corresponding threads 11 of the stud so that threads 11 protrude forwardly from head 17 and also protrude for a distance into the unthreaded section 21 of the sleeve as shown in FIG. 1. With the stud and sleeve in this relative position, a suitable compressive tool is applied to the thickened portion 23 shown in FIG. 2 to reduce the outside diameter of rear portion 23 of the sleeve to substantially the same as the outside diameter 22 of the rest of the shank of the sleeve, as shown in FIG. 1, which action will cause a swaging or flow of the metal of portion 23 into the righthand threads 13 at the rear of the stud. This will, in effect, produce a righthand thread 13a at sleeve portion 23 engaging the threads 13 of the stud. Since threads 11 and 20 are lefthand threads and threads 13 and 13a are righthand threads, the stud 10 can no longer be turned or torqued readily within sleeve 13 as it could prior to the formation of threads 13a. In this condition of the assembly of the stud and sleeve shown in FIG. 1, the fastener is ready for use in fastening together sheets or bodies such as 24 and 25 shown in FIG. 1.

According to common practice in riveting operations, the members 24 and 25 will be provided with respecitve aligned holes 26 and 27 through which the shank of the sleeve is protruded until the head 17 abuts the forward member 24. The fastener will be selected to have a length such that the unthreaded section 21 of the sleeve starts at a position somewhat forward of the rear face of the rearmost fastener member 25 while the righthand threads of the stud are positioned to the rear of the rearmost face of the fastened body. preferably the rear end of the stud extends beyond the rear end of the sleeve as shown in FIG. 1.

Figure 5:
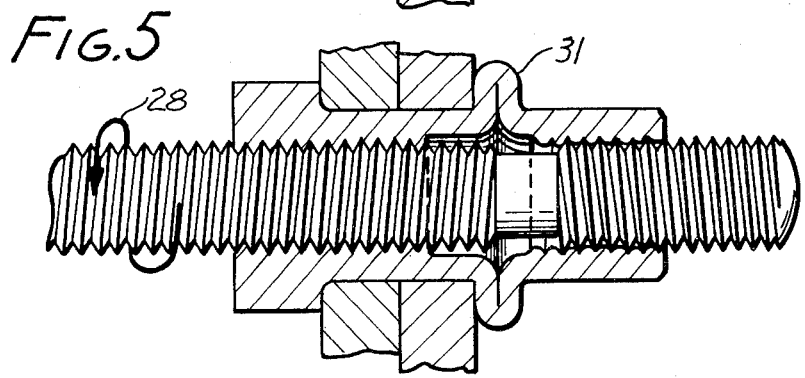
FIG. 5 shows the fastener of FIG. 1 after it has been set by a torquing operation.

To set the fastener, the portion of the stud protruding forwardly from head 17 of the sleeve is grasped by a suitable torquing tool having a holding chuck or the like (not shown) to torque the stud in the clockwise direction as seen from the front of the fastener, as represented by arrow 28 in FIG. 5. The tool should be provided with a device for holding the sleeve head 17 against turning while it is torquing the stud. The holding of the sleeve is facilitated by providing the head 17 with opposite flats 29 and 30 adapted to be gripped by the tool. The setting of the fastener by this torquing operation will require a relatively great amount of torque because of the stud threads 11 and 13 being of opposite hand. But by the application of sufficient torquing force, the stud can be turned within sleeve threads 20 and 13a in the direction which will drawn the rear end of the sleeve toward the forward end. This action will move the rear part of the sleeve shank forwardly toward the rear of the fastened bodies, thereby causing the portion of the sleeve to the rear of the rearmost fastened body and forward of the stud threads 13, to buckle outwardly to produce a substantial bulge 31 against the rear of the rearmost fastened body, thereby setting the fastener, as shown in FIG. 5. FIG. 5 illustrates the shortening of the sleeve length by this operation. After the setting of the fastener in this manner, the forward part of the stud may be cut off at the front face of the sleeve head 17, if desired.

The material selected for the sleeve shank will be ductile enough so that it will buckle to form the bulge 31. This can be accomplished without stripping of threads by providing enough threads so that there will always be ample threads 11 and 13 engaged with their complementary threads 20 and 13a. Thus by providing a large enough number of engaged threads the shear force on each individual thread can be maintained small enough to prevent stripping while still providing enough total force to bulge the sleeve at 31. Insurance of maintaining ample threads can readily be done by dimensioning the components so that in the normal assembled condition shown in FIG. 1, there is a substantial number of threads 11 protruding rearwardly within the unthreaded portion 18 of the sleeve and also a substantial number of threads 13 protruding rearwardly from the rear end of the sleeve. Thus during the setting operation when the stud is drawn forwardly within the sleeve there will always be sufficient threads 11 and 13 to the rear of threads 20 and 13a respectively, to keep all of threads 20 and 13a completely filled until setting is completed.

The blind fastener of this invention can be easily manufactured and assembled and can be readily set to fasten bodies together. Furthermore it provides a very secure fastening. It will not loosen in the presence of vibration or usage for the reason that the threads at the ends of the stud are of opposite hand and hence, resist any ordinary tendency for relative turning between the sleeve and stud. Ordinary forces of vibration are insufficient to turn the stud.

Modifications within the scope of the invention may suggest themselves to those skilled in the art. Although the fastener illustrated and described herein has right hand threads at the rear and left hand threads at the front, this relationship may be reversed.

It will be understood that the embodiments of the invention illustrated and described herein are given by way of illustration and not of limitation, and that modifications or equivalents or alternatives within the scope of the invention may suggest themselves to those skilled in the art.

1. A blind fastener assembly comprising:
  a stud having a first section of threads of one hand and a second section of threads of the other hand; and
  a hollow tubular sleeve having a head and a first length of internal threads of said one hand threaded to said threads of one hand of said stud, and a second length of internal threads of said other hand threaded to said threads of said other hand of said stud;
  whereby when the sleeve is passed through bodies to be fastened with the head at the front side of said bodies, and the stud is then torqued relative to the sleeve in the direction which draws the first and second lengths of sleeve threads toward each other, a part of the sleeve to the rear of the bodies is buckled and bears against the rear of the bodies, thereby setting the fastener.

2. A fastener assembly according to claim 1 in which the first and second sections of the stud are separated by a third section having no threads.

3. A fastener assembly according to claim 2 in which said threads of one hand of said sleeve are separated from the threads of the other hand of said sleeve by a section having no threads.

4. An assembly according to claim 1 in which said first section of threads of the stud extends forwardly from said head of the sleeve and also rearwardly from said first length of threads of the sleeve.

5. An assembly according to claim 1 in which said second section of threads of the stud extends rearwardly from the rear end of the second length of threads of the sleeve.

* * * * *